United States Patent
Fazal et al.

(10) Patent No.: US 7,840,698 B2
(45) Date of Patent: Nov. 23, 2010

(54) DETECTION OF HIDDEN WIRELESS ROUTERS

(75) Inventors: Lookman Fazal, Somerset, NJ (US); Martin Kappes, Gilching (DE); Anjur Sundaresan Krishnakumar, Rocky Hill, NJ (US); Sachin Nandkumar Ganu, Piscataway, NJ (US); P Krishnan, North Plainfield, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1624 days.

(21) Appl. No.: 10/757,676

(22) Filed: Jan. 14, 2004

(65) Prior Publication Data

US 2005/0060434 A1 Mar. 17, 2005

Related U.S. Application Data

(60) Provisional application No. 60/502,486, filed on Sep. 12, 2003.

(51) Int. Cl.
*G06F 15/173* (2006.01)

(52) U.S. Cl. ............... 709/238; 709/249; 709/225; 455/411

(58) Field of Classification Search ............... 709/245, 709/238, 249, 225; 726/11, 15, 23; 455/411
See application file for complete search history.

(56) References Cited

U.S. PATENT DOCUMENTS

| | | | |
|---|---|---|---|
| 5,922,073 A | 7/1999 | Shimada | |
| 5,943,425 A | 8/1999 | Mizikovsky | |
| 6,377,810 B1 | 4/2002 | Geiger et al. | |
| 6,522,888 B1 | 2/2003 | Garceran et al. | |
| 6,577,274 B1 | 6/2003 | Baiikar | |
| 2002/0073338 A1* | 6/2002 | Burrows et al. | 709/224 |
| 2002/0078202 A1* | 6/2002 | Ando et al. | 709/225 |
| 2002/0161920 A1* | 10/2002 | Etoh | 709/238 |
| 2003/0087629 A1* | 5/2003 | Juitt et al. | 455/411 |

OTHER PUBLICATIONS

Sara Harris, VPN and WEP, Wireless 802.11b security in a corporate environment, Intel Information Technology White Paper, Jan. 2003.

* cited by examiner

*Primary Examiner*—Jungwon Chang
(74) *Attorney, Agent, or Firm*—DeMont & Breyer, LLC (57) ABSTRACT

A technique is disclosed for detecting hidden wireless routers that constitute security threats in telecommunications networks that comprise a wireless network portion and a wireline network portion. In accordance with the illustrative embodiment of the invention, a test station is used in the wireless portion of a network to detect the presence of a hidden wireless router. Furthermore, in some embodiments, a test server is used in the wireline portion of the network in order to detect packets that are illegitimately routed from the wireless portion to the wireline portion of the network through the hidden wireless router.

3 Claims, 10 Drawing Sheets

Figure 1 (Prior Art)

Telecommunications Network 100

Figure 2

Telecommunications Network 200

DETECTION OF HIDDEN WIRELESS ROUTERS

CROSS-REFERENCE TO RELATED APPLICATIONS

This application claims the benefit of U.S. Provisional Patent Application Ser. No. 60/502486, entitled "Detection of Hidden Wireless Routers," filed on 12 Sep. 2003, which is incorporated by reference.

FIELD OF THE INVENTION

The present invention relates to telecommunications in general, and, in particular, to network security.

BACKGROUND OF THE INVENTION

Figure 1:
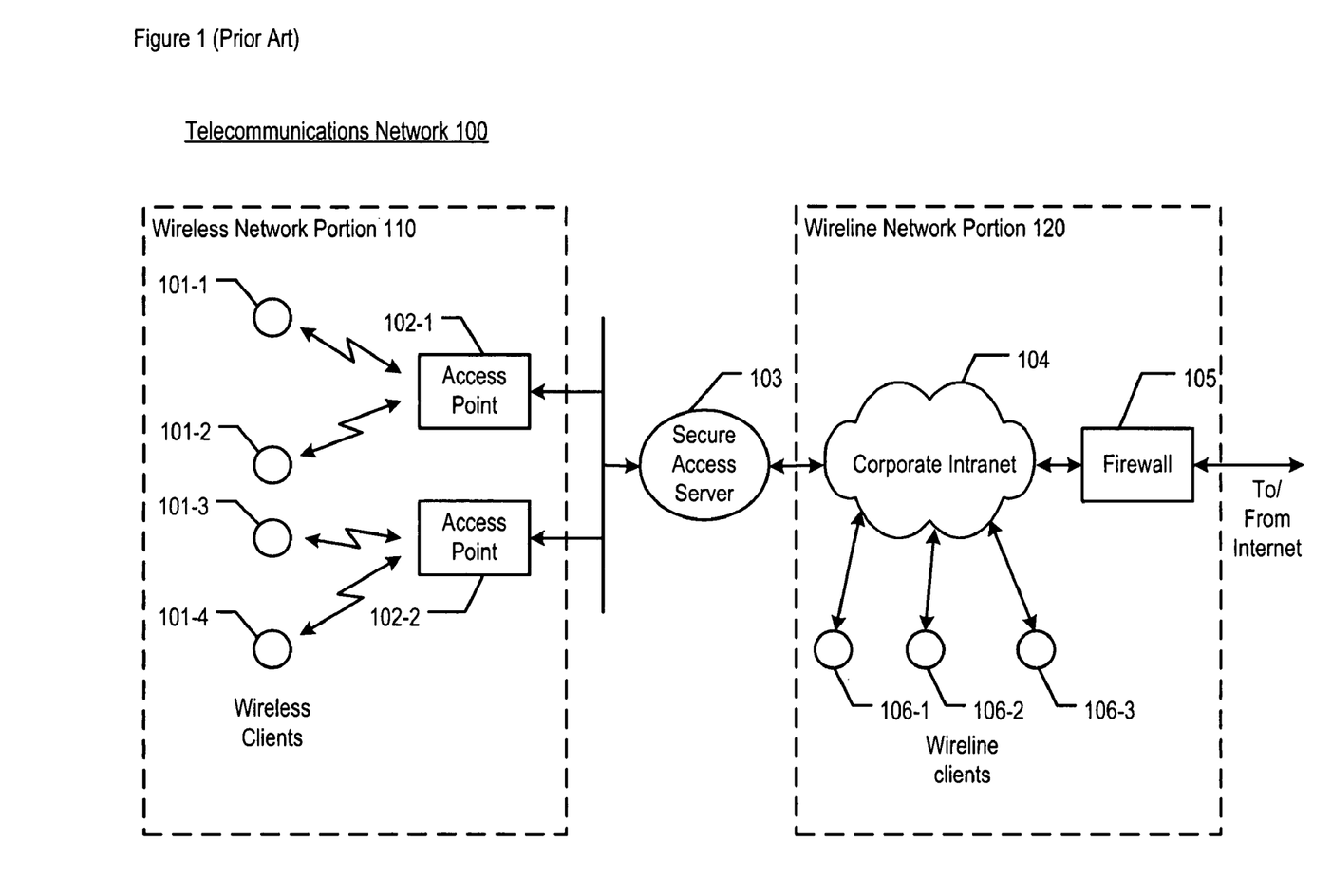
FIG. 1 depicts a schematic diagram of the salient components of a typical network in the prior art.

FIG. 1 depicts a schematic diagram of the salient components of a typical network in the prior art, interconnected as shown. Telecommunications network 100 comprises wireless network portion 110 and wireline network portion 120. Wireless clients 101-1 through 101-4 and access points 102-1 and 102-2 constitute wireless network portion 110. Corporate intranet 104, firewall 105, and wireline clients 106-1 through 106-3 constitute wireline portion 120. Secure access server 103 allows access from wireless network portion 110 to wireline network portion 120.

Wireline clients 106-1 through 106-3 are communication stations that can directly access corporate intranet 104, for example, through an Ethernet cable that is plugged into a wall jack in a corporate building. The physical security of the corporate building provides significant assurance that only authorized personnel may enter the building and connect a client to the network via a wall jack. In some instances, there may be an additional authentication mechanism in place to further ensure that a particular client connected to the network through a wall jack is authorized to access the network. In other instances, there is no additional authentication mechanism. Once a client is plugged into a wall jack and has passed the authentication procedure, the client can then access resources (e.g., mail servers, printer servers, database servers, other clients, etc.) anywhere on corporate intranet 104 or can access resources on the public Internet through firewall 105.

In contrast, wireless clients 101-1 through 101-4 are required to pass an authentication procedure, supervised by secure access server 103, to access corporate intranet 104. Wireless clients 101-1 through 101-4 are required to authenticate themselves through secure access server 103, which wireline clients 106-1 through 106-3 are not required to do because of the inherent differences between wireless and wireline access. For example, although access point 102-1 can be physically located within a physically secure corporate building, wireless client 101-1 might be located outside that building, in a car parked across the street from the building and operated by a person who is unauthorized to access the network.

Prior to passing the authentication procedure, a wireless client is assigned, at the time it first associates with an access point, a private network layer (e.g., Internet protocol, etc.) address that is usable only within "insecure," wireless network portion 110. Only when the client passes the authentication procedure is it assigned a routable network layer address to communicate with wireline network portion 120.

One authentication procedure in the prior art involves a virtual private network (VPN) server. The VPN server used is of the type that has also been applied to the problem of providing security for (i) access to corporate intranets by dial-up access over the public telephone network or (ii) access to corporate intranets by the establishment of secure VPN tunnels through the networks of public internet access providers employing such physical access facilities as digital subscriber lines and cable modem services.

One advantage of using a VPN server for authentication is that corporations have extensive experience with the use of VPN servers and have found VPN servers convenient to use.

SUMMARY OF THE INVENTION

One disadvantage of using a VPN server for authentication is that the VPN server-based security mechanisms implicitly assume that a given client is, at any one time, connected to either the insecure portion of the network or the secure portion of the network, but not both. When a client is connected to both the wireless insecure portion of a network and the wireline secure portion, the client can unknowingly route traffic between a wireless interloper and the secure network. For the purposes of this specification, a client that is connected to both the wireless insecure portion of a network and the wireline secure portion is called a "hidden wireless router."

A hidden wireless router comprises a communications station that has two or more network interfaces and that routes, forwards, bridges, or otherwise passes protocol data units from one network interface to another. Consequently, hidden wireless routers that are present in the network constitute a security threat by allowing illegitimate access to corporate networks despite the implementation of standard, recommended security practices. A "rogue" wireless client that knows of or discovers the existence of a hidden wireless router can use the hidden wireless router to gain access to the corporate network while bypassing the authentication procedures normally required of wireless clients.

The present invention provides a technique for detecting hidden routers in wireless networks so that corrective action can be taken. The illustrative embodiment of the present invention utilizes a test station deployed in the wireless network portion of a network and a test server deployed in the wireline network portion of a network to detect the presence and operation of hidden wireless routers and rogue clients.

The test station of the illustrative embodiment receives, demodulates, and processes radio signals emitted by wireless clients. The test station, or some other device within the network, then examines and compares address information of protocol data units sent from some wireless clients to other wireless clients, in order to identify any wireless client that appears to be operating as an unauthorized router. For example, a wireless client that is operating as an unauthorized router might receive protocol data units from other wireless clients with differing network layer destination addresses. The test station or other device detects such suspicious address information and, upon detection, triggers an alarm.

The test server deployed, in some embodiments, in the wireline network portion of a network is used to directly detect protocol data units that have been routed from the wireless network portion to the wireline network portion via a wireless client. The wireless client can then be identified as a hidden wireless router and disabled. Detecting and identifying the routing wireless client is accomplished by sending a protocol data unit from a first wireless station to a second wireless station, with the destination network layer address equal to the test server address, and a "next-hop" address equal to the wireless interface address of the second wireless station. If this protocol data unit is received at the test server, the second wireless station can be thereby identified as a suspected hidden wireless router and measures can be taken to disable it.

An illustrative embodiment of the present invention comprises: receiving a protocol data unit that comprises a destination address; and transmitting an alarm when the destination address is not associated with a secure access server.

DETAILED DESCRIPTION

Figure 2:
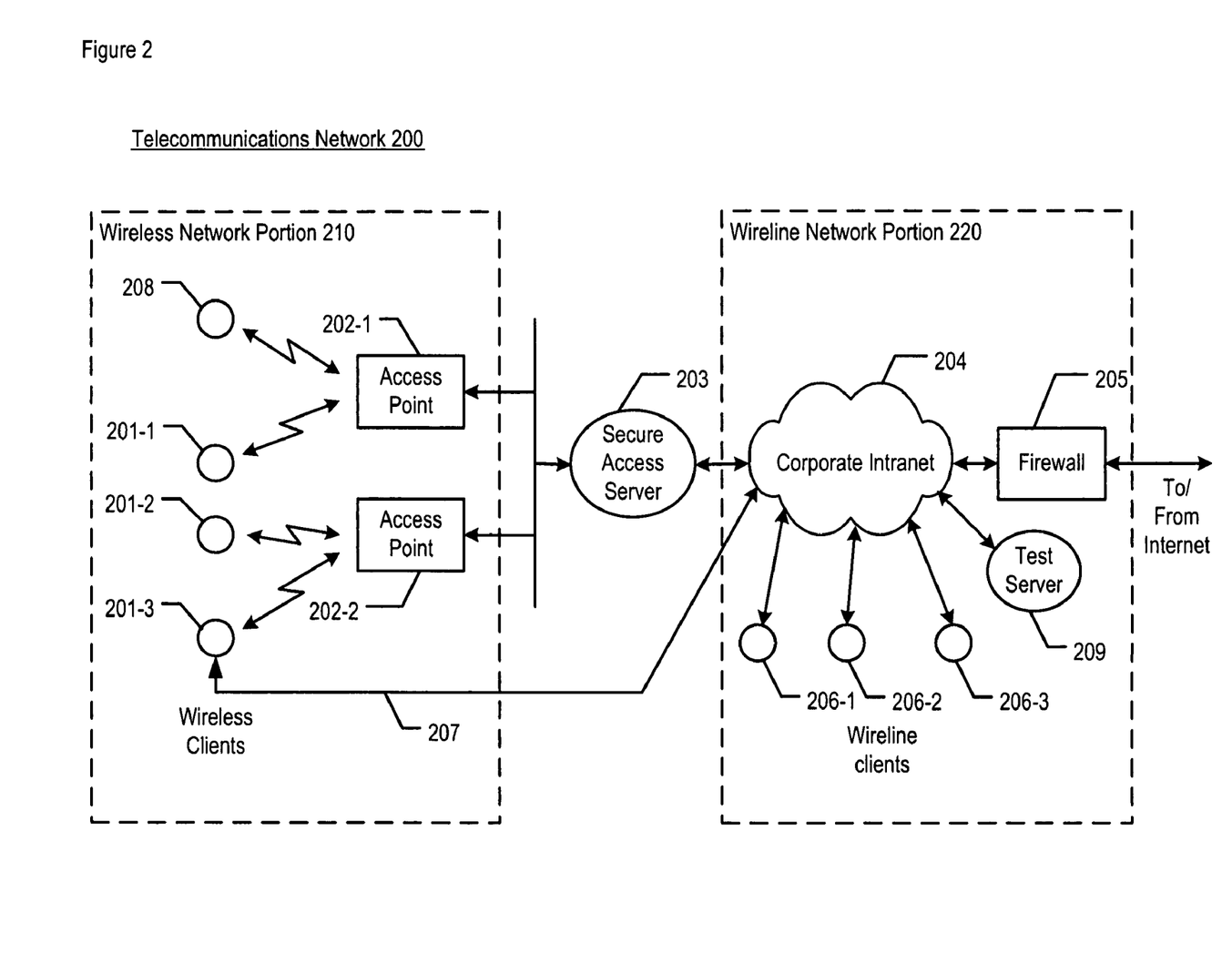
FIG. 2 depicts a schematic diagram of the salient components of network 200, in accordance with the illustrative embodiment of the present invention.

FIG. 2 depicts a schematic diagram of the salient components of telecommunications network 200, interconnected as shown and in accordance with the illustrative embodiment of the present invention. Telecommunications network 200 comprises wireless network portion 210 and wireline network portion 220. Wireless clients 201-1 through 201-3, access points 202-1 and 202-2, and test station 208 constitute wireless network portion 210. Corporate intranet 204, firewall 205, wireline clients 206-1 through 206-3, and test server 209 constitute wireline network portion 220.

Wireless client 201-$i$ wherein i is all integers selected from the set $\{1, 2, 3\}$, is a device that is used to communicate with other devices, both within network 200 and external to network 200. An example of a wireline client is a computer that comprises an IEEE 802.11 network interface card. It will be clear to those skilled in the art how to make and use wireless client 201-$i$.

Access point 202-$j$, wherein j is all integers selected from the set $\{1, 2\}$, provides for wireless client 201-$i$ a communications path to devices in networks external to wireless network portion 210. Furthermore, wireless client 201-$i$ communicates with other wireless clients in wireless network portion 210 through access point 202-$j$, because access point 202-$j$ coordinates the communications within wireless network portion 210. It will be clear to those skilled in the art how to make and use access point 202-$j$.

Wireline client 206-$k$, wherein k is all integers selected from the set $\{1, 2, 3\}$, is a device that is used to communicate with other devices, both within network 200 and external to network 200. An example of a wireline client is a computer that comprises an Ethernet network interface card. It will be clear to those skilled in the art how to make and use wireline client 206-$k$.

It will be clear to those skilled in the art that network 200 can comprise different numbers of wireless clients, access points, and wireline clients than those depicted.

Secure access server 203 allows access from wireless network portion 210 to wireline network portion 220. Secure access server 203 securely interconnects the wireless network with the corporate intranet in well-known fashion. Examples of secure access server 203 are a main virtual private network (VPN) server, a backup virtual private network server, etc.

Wireless clients 201-1 through 201-3 are required to pass an authentication procedure, supervised by secure access server 203, to access corporate intranet 204. Wireless clients 201-1 through 201-3 are required to authenticate themselves through secure access server 203.

Although access point 202-1, for example, can be physically located within a physically secure corporate building, wireless client 201-1 might be located outside that building, in a car parked across the street from the building and operated by a person who is unauthorized to access the network. Therefore, for pedagogical purposes, wireless client 201-1 is a "rogue station" that is attempting to gain illegitimate access to corporate intranet 204. "Rogue" wireless client 201-1 attempts to gain illegitimate access through one of wireless clients 201-2 and 201-3, the other wireless clients present. In the pedagogical example, rogue wireless client 201-1 attempts to gain access through wireless client 201-3.

Wireless client 201-3 is a "hidden wireless router" because it has both a wireless network interface and a wireline network interface via wireless network connection 207 to corporate intranet 204. Such "dual-homed" clients are not uncommon. For example, many laptop computers are equipped with interface cards for both IEEE 802.11 wireless networks and wireline Ethernet-type LANs. Furthermore, many corporate networks provide both wireless access through a system such as IEEE 802.11 and wireline access through network wall jacks located throughout corporate buildings.

To function as a hidden wireless router to the illegitimate benefit of rogue wireless client 201-1, a dual-homed client such as wireless client 201-3 must implement routing or bridging, as is known in the art. Routing or bridging causes protocol data units (PDU) that arrive on the wireless interface to leave on the wireline network interface, and vice versa. This can be accomplished with (i) "connection sharing" or (ii) "network address translation," which are operating system features that are well-known in the art. It will be clear to those skilled in the art how "connection sharing" and "network address translation" can be used to set up protocol data unit forwarding between the wireless and wireline network interfaces of wireless client 201-3. It will also be clear to those skilled in the art how a dual-homed client can be configured to function as a hidden wireless router, either intentionally or unintentionally.

Furthermore, it will be clear to those skilled in the art how a rogue wireless client, such as wireless client 201-1, can be made aware of the existence of a hidden wireless router, such as wireless client 201-3.

Once rogue wireless client 201-1 becomes aware of the existence of the hidden wireless router (i.e., "router" wireless client 201-3), rogue wireless client 201-1 can proceed in the following manner to gain illegitimate access to corporate intranet 204. Rogue wireless client 201-1 sends a protocol data unit through wireless network portion 210 to router wireless client 201-3. As depicted in FIG. 2, the path traversed by this protocol data unit can comprise a network that interconnects two access points, if rogue wireless client 201-1 and router wireless client 201-3 are associated with two different access points.

The protocol data unit comprises (i) a destination address that is outside of wireless network portion 210 (e.g., the address of a server in corporate intranet 204, etc.), and (ii) a "next-hop" address that is associated with the wireless interface of router wireless client 201-3. Next-hop addresses are commonly used to cause a protocol data unit to be routed to a device (such as a router) that is capable of forwarding the protocol data unit to the destination address. In this example, the "router" is router wireless client 201-3, which forwards the protocol data unit on its wireline interface toward corporate intranet 204. For example, router wireless client 201-3 forwards by first using the network address translation feature to substitute for the private, non-routable source address of rogue wireless client 201-1 the combination of a routable Internet protocol (IP) address of its own wireline interface and an unused Transmission Control Protocol (TCP) or Unnumbered Datagram Protocol (UDP) port number.

If a response comes back from corporate intranet 204 (e.g., a file of proprietary information sought by rogue wireless client 201-1, etc.), the protocol data units that convey the response are routed to router wireless client 201-3, which then uses its network address translation capability to translate the destination address and port number to the private network layer address (e.g., Internet protocol, etc.) of rogue wireless client 201-1. Router wireless client 201-3 then forwards the protocol data units to rogue wireless client 201-1.

Test station 208 and test server 209 can be used to detect the presence and operation of rogue wireless client 201-1 and router wireless client 201-3, in accordance with the illustrative embodiment of the present invention. Test station 208 and test server 209 are described in detail below.

Figure 3:
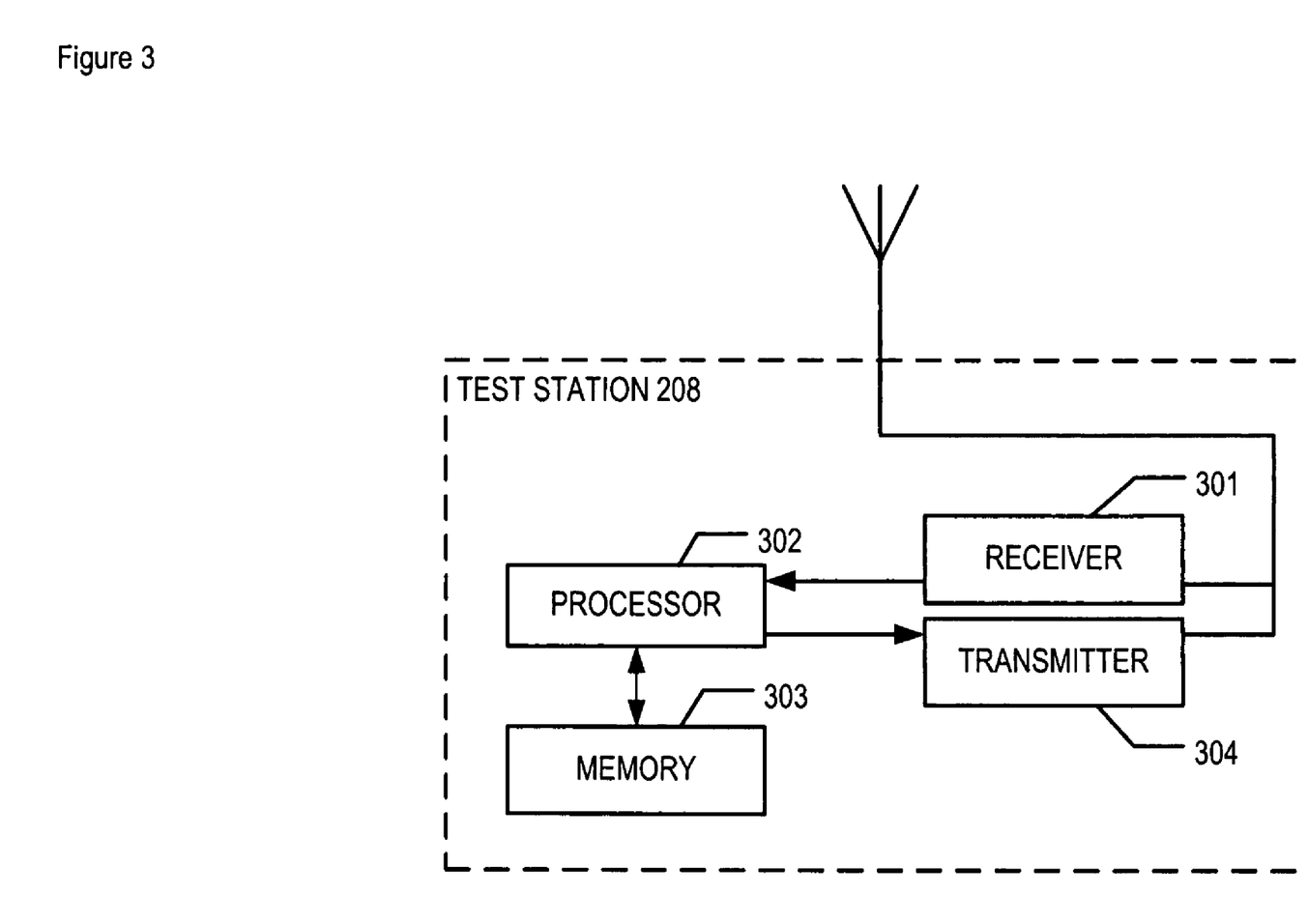
FIG. 3 depicts a block diagram of the salient components of test station 208 in accordance with the illustrative embodiment of the present invention.

FIG. 3 depicts a block diagram of the salient components of test station 208 in accordance with the illustrative embodiment of the present invention. Test station 208 comprises receiver 301, processor 302, memory 303, and transmitter 304, interconnected as shown.

Test station 208 is a device that receives, demodulates, and processes the radio signals emitted by stations on wireless network portion 210 and, in some embodiments, comprises the functionality that is used to determine the presence of rogue wireless client 201-1 or router wireless client 201-3 or both. In other embodiments, the functionality of the illustrative embodiment resides in access point 202-*j*. Furthermore, in some embodiments, test station 208 constitutes a wireless client that can be used to access corporate intranet 204.

The addresses detected by test station 208 comprise data link layer (DLL) addresses (e.g., Medium Access Control [MAC] layer addresses, etc.) and network layer (NL) addresses (e.g., Internet Protocol [IP] addresses, etc.).

Receiver 301 is a circuit that is capable of receiving packets from the wireless medium, in well-known fashion, and of forwarding them to processor 302. It will be clear to those skilled in the art how to make and use receiver 301.

Processor 302 is a general-purpose processor that is capable of performing the tasks described below and with respect to FIGS. 5 through 10. It will be clear to those skilled in the art, after reading this specification, how to make and use processor 302.

Memory 303 is capable of storing programs and data used by processor 302. It will be clear to those skilled in the art how to make and use memory 303.

Transmitter 304 is a circuit that is capable of transmitting packets into the wireless medium, in well-known fashion, from processor 304. It will be clear to those skilled in the art how to make and use transmitter 304.

Figure 4:
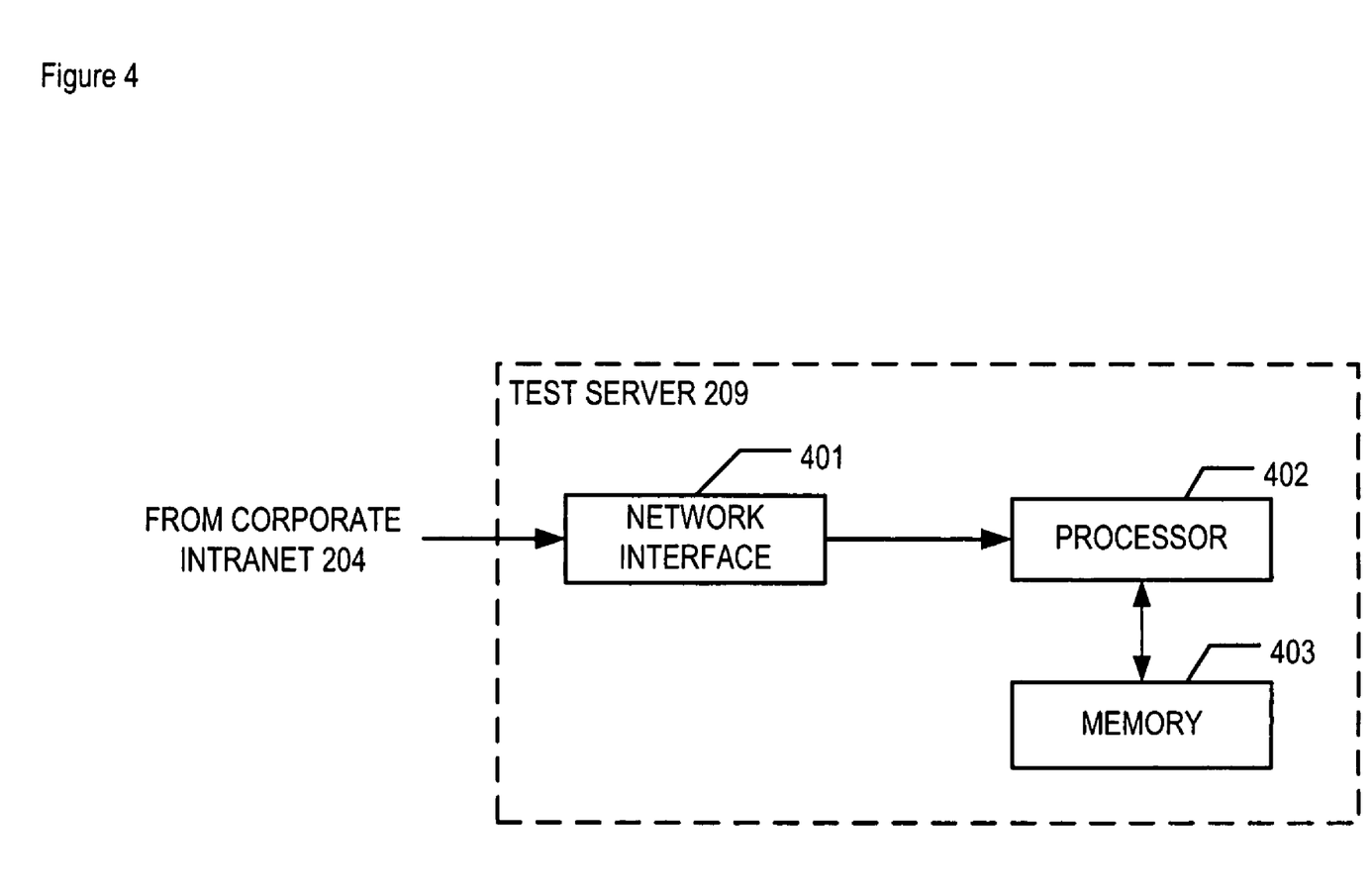
FIG. 4 depicts a block diagram of the salient components of test server 209 in accordance with the illustrative embodiment of the present invention.

FIG. 4 depicts a block diagram of the salient components of test server 209 in accordance with the illustrative embodiment of the present invention. Test server 209 comprises network interface 401, processor 402, and memory 403, interconnected as shown.

In some embodiments, test server 209 is a dedicated device that is added to network 200. In other embodiments, the functionality in this specification that is associated with test server 209 is resident in a pre-existing device, such as a file server.

Network interface 401 is a circuit that is capable of receiving, in well-known fashion, packets from corporate intranet 204. Network interface 401 is also capable of forwarding the packets received to processor 402. It will be clear to those skilled in the art how to make and use network interface 401.

Processor 402 is a general-purpose processor that is capable of performing the tasks described below and with respect to FIGS. 5 through 10. It will be clear to those skilled in the art, after reading this specification, how to make and use processor 402.

Memory 403 is capable of storing programs and data used by processor 402. It will be clear to those skilled in the art how to make and use memory 403.

Figure 5:
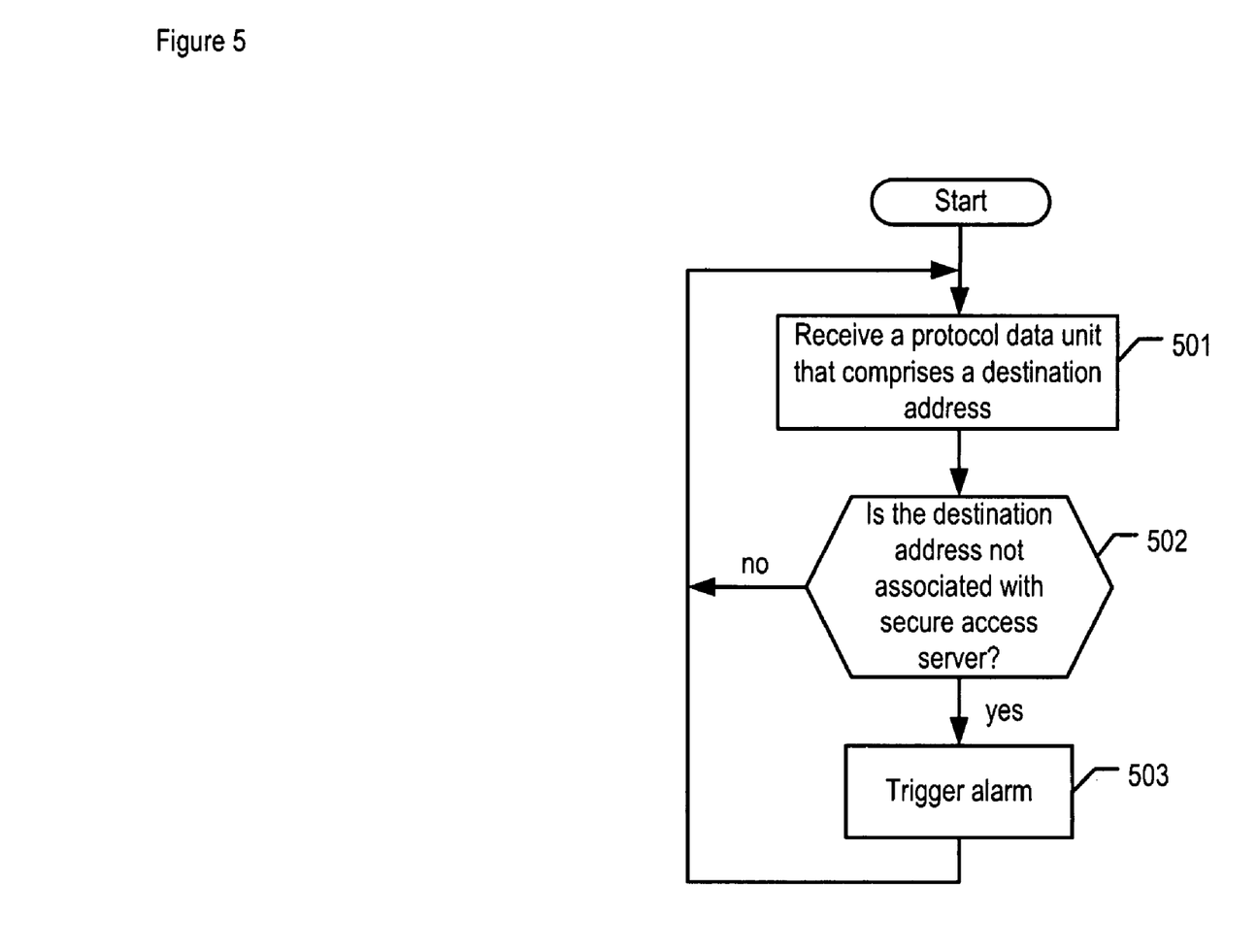
FIG. 5 depicts a flowchart of the salient tasks of a first method for detecting the presence of a hidden wireless router, in accordance with the illustrative embodiment of the present invention.

FIG. 5 depicts a flowchart of the salient tasks of a first method for detecting the presence of a hidden wireless router, represented in the example by wireless client 201-3, in accordance with the illustrative embodiment of the present invention. It will be clear to those skilled in the art which tasks depicted in FIG. 5 can be performed simultaneously or in a different order than that depicted.

At task 501, test station 208 receives a protocol data unit that comprises a destination address, in accordance with the illustrative embodiment of the present invention. The protocol data unit could have been transmitted by rogue wireless client 201-1. In some embodiments, the destination address is a data link layer (e.g., medium access control [MAC] address, etc.). In other embodiments, the destination address is a network layer (e.g., Internet protocol, etc.) address.

At task 502, a device in network 200 compares the destination address of the protocol data unit with the address of secure access server 203. If the destination address is associated with secure access server 203, control proceeds to task 501. If, however, the destination address is not associated with secure access server 203, control proceeds to task 503.

An address can be associated with secure access server 203, for example, by being the address of secure access server 203 itself, or, as another example, by being the address of another device through which protocol data units must pass en route to secure access server 203.

When the destination address is not associated with secure access server 203, the destination address is possibly associated with wireless client 201-3, the hidden wireless router in the illustrative example. In some embodiments, the destination address is associated with a device that is associated with both (i) a network layer address in a first network (e.g., wireless network portion 210, etc.) and (ii) a network layer address in a second network (e.g., wireline network portion 220, etc.). An example of such a device is a hidden wireless router.

At task 503, a device in network 200 triggers an alarm because the destination address is different than the address of secure access server 203. In some embodiments, the alarm comprises the network layer address in a first network or the network layer address in a second network or both.

Figure 6:
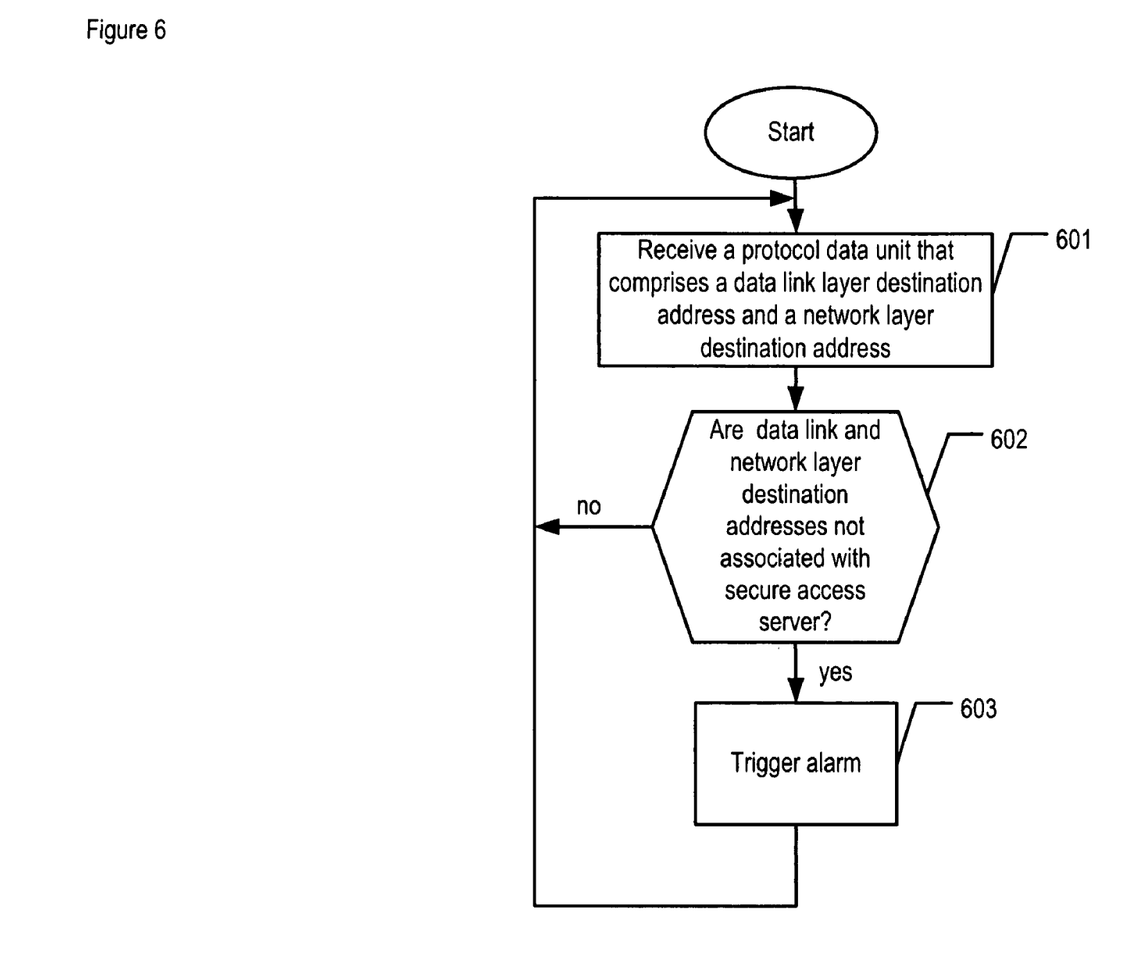
FIG. 6 depicts a flowchart of the salient tasks of a second method for detecting the presence of a hidden wireless router, in accordance with the illustrative embodiment of the present invention.

FIG. 6 depicts a flowchart of the salient tasks of a second method for detecting the presence of a hidden wireless router, in accordance with the illustrative embodiment of the present invention. It will be clear to those skilled in the art which tasks depicted in FIG. 6 can be performed simultaneously or in a different order than that depicted.

At task 601, test station 208 receives a protocol data unit that comprises a data link layer destination address and a network layer destination address, in accordance with the illustrative embodiment of the present invention. The protocol data unit could have been transmitted by rogue wireless client 201-1.

At task 602, a device in network 200 examines the data link layer destination address and the network layer destination address of the protocol data unit. If these addresses are associated with secure access server 203, control proceeds to task 601. If, however, these addresses are not associated with secure access server 203, control proceeds to task 603.

When the destination address is not associated with secure access server 203, the destination address is possibly associated with wireless client 201-3, which is the hidden wireless router in the illustrative example. In some embodiments, the destination address is associated with a device that is associated with both (i) a network layer address in a first network (e.g., wireless network portion 210, etc.) and (ii) a network layer address in a second network (e.g., wireline network portion 220, etc.). An example of such a device is a hidden wireless router.

At task 603, a device in network 200 triggers an alarm. In some embodiments, the alarm comprises the network layer address in a first network or the network layer address in a second network or both.

Figure 7:
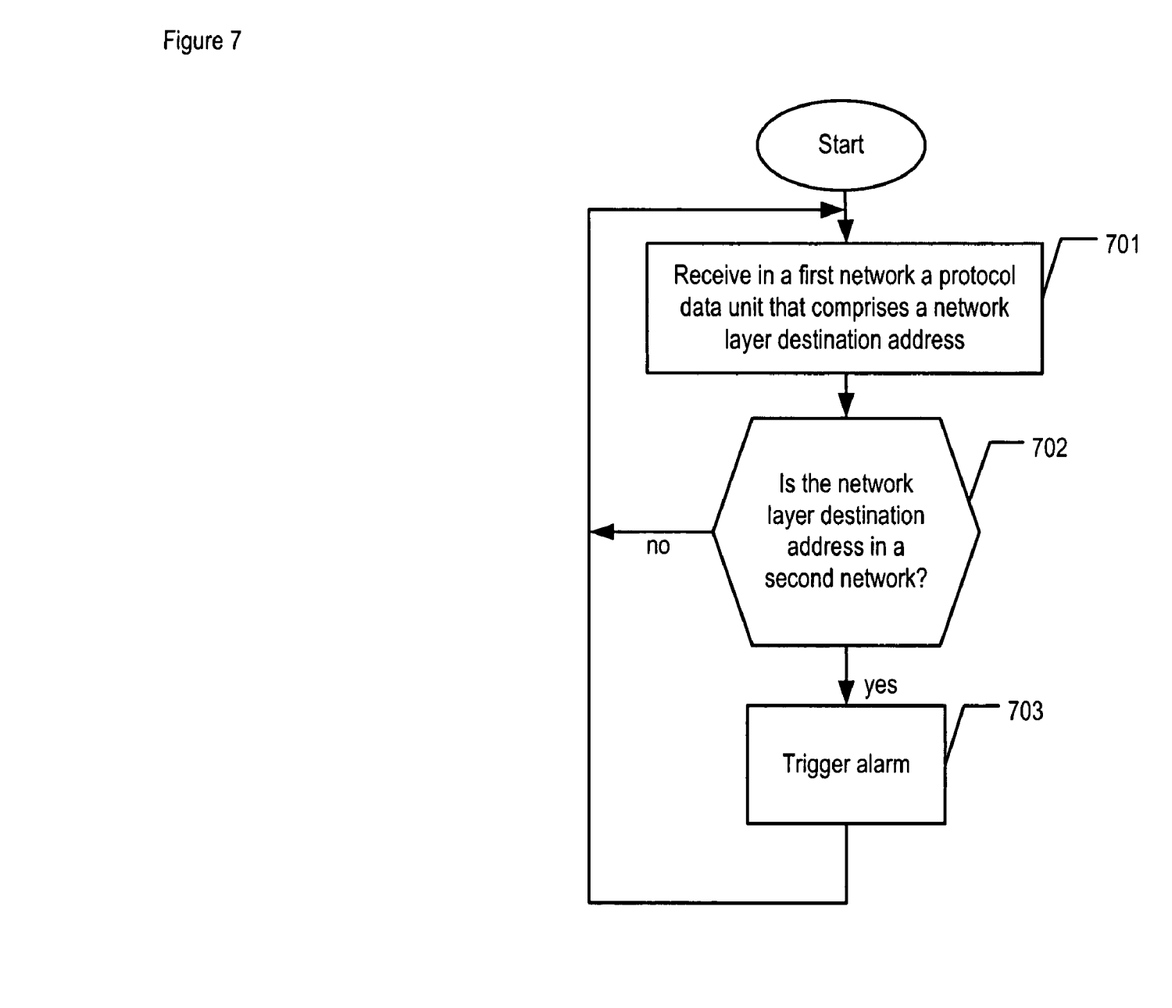
FIG. 7 depicts a flowchart of the salient tasks of a third method for detecting the presence of a hidden wireless router, in accordance with the illustrative embodiment of the present invention.

FIG. 7 depicts a flowchart of the salient tasks of a third method for detecting the presence of a hidden wireless router, in accordance with the illustrative embodiment of the present invention. It will be clear to those skilled in the art which tasks depicted in FIG. 7 can be performed simultaneously or in a different order than that depicted.

At task 701, test station 208 in a first network (e.g., wireless network portion 210, etc.) receives a protocol data unit that comprises a network layer destination address in accordance with the illustrative embodiment of the present invention. The protocol data unit could have been transmitted by rogue wireless client 201-1.

At task 702, a device in network 200 examines the network layer destination address of the protocol data unit. If the address is not associated with a second network (e.g., wireline network portion 220, etc.), control proceeds to task 701. If, however, these addresses are associated with the second network, control proceeds to task 703.

In some embodiments, the protocol data unit further comprises a data link layer destination address that is associated with a device that is, in turn, associated with both (i) a network layer address in a first network (e.g., wireless network portion 210, etc.) and (ii) a network layer address in a second network (e.g., wireline network portion 220, etc.). An example of such a device is a hidden wireless router.

At task 703, a device in network 200 triggers an alarm. In some embodiments, the alarm comprises the network layer address in a first network or the network layer address in a second network or both.

Figure 8:
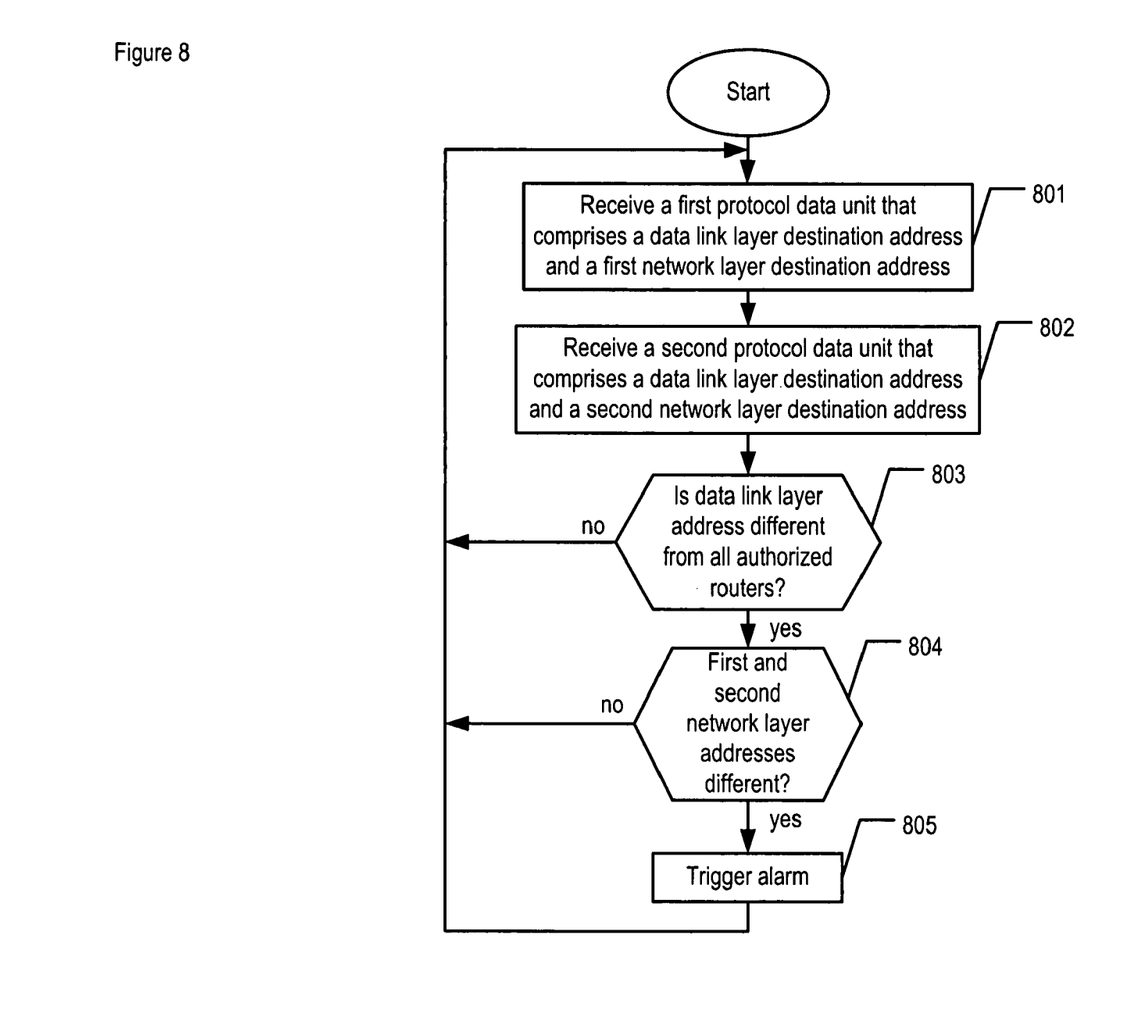
FIG. 8 depicts a flowchart of the salient tasks of a fourth method for detecting the presence of a hidden wireless router, in accordance with the illustrative embodiment of the present invention.

FIG. 8 depicts a flowchart of the salient tasks of a fourth method for detecting the presence of a hidden wireless router, in accordance with the illustrative embodiment of the present invention. It will be clear to those skilled in the art which tasks depicted in FIG. 8 can be performed simultaneously or in a different order than that depicted.

At task 801, test station 208 receives a first protocol data unit, in accordance with the illustrative embodiment of the present invention. The first protocol data unit comprises a data link layer destination address and a first network layer destination address.

The data link layer destination address, in some embodiments, is associated with a device that is, in turn, associated with both (i) a network layer address in a first network (e.g., wireless network portion 210, etc.) and (ii) a network layer address in a second network (e.g., wireline network portion 220, etc.). An example of such a device is a hidden wireless router.

At task 802, test station 208 receives a second protocol data unit, in accordance with the illustrative embodiment of the present invention. The second protocol data unit comprises the data link layer destination address and a second network layer destination address.

At task 803, a device in network 200 compares the data link layer destination address to the data link layer addresses of authorized routers. An authorized router is a router known to the network administrator and one that may legitimately engage in the routing of protocol data units. If the data link layer destination address of the first and second protocol data units is the same as the data link layer address of an authorized router, control proceeds to task 801. If the data link layer destination address of the first and second protocol data units is different from the data link layer addresses of all authorized routers, control proceeds to task 804.

At task 804, a device in network 200 compares the network layer destination address of the first and second protocol data units with each other. If they are the same, control proceeds to task 801. If they are different, as can be the case for a hidden wireless router, control proceeds to task 805.

At task 805, a device in network 200 triggers an alarm. In some embodiments, the alarm comprises the network layer address in a first network or the network layer address in a second network or both.

Figure 9:
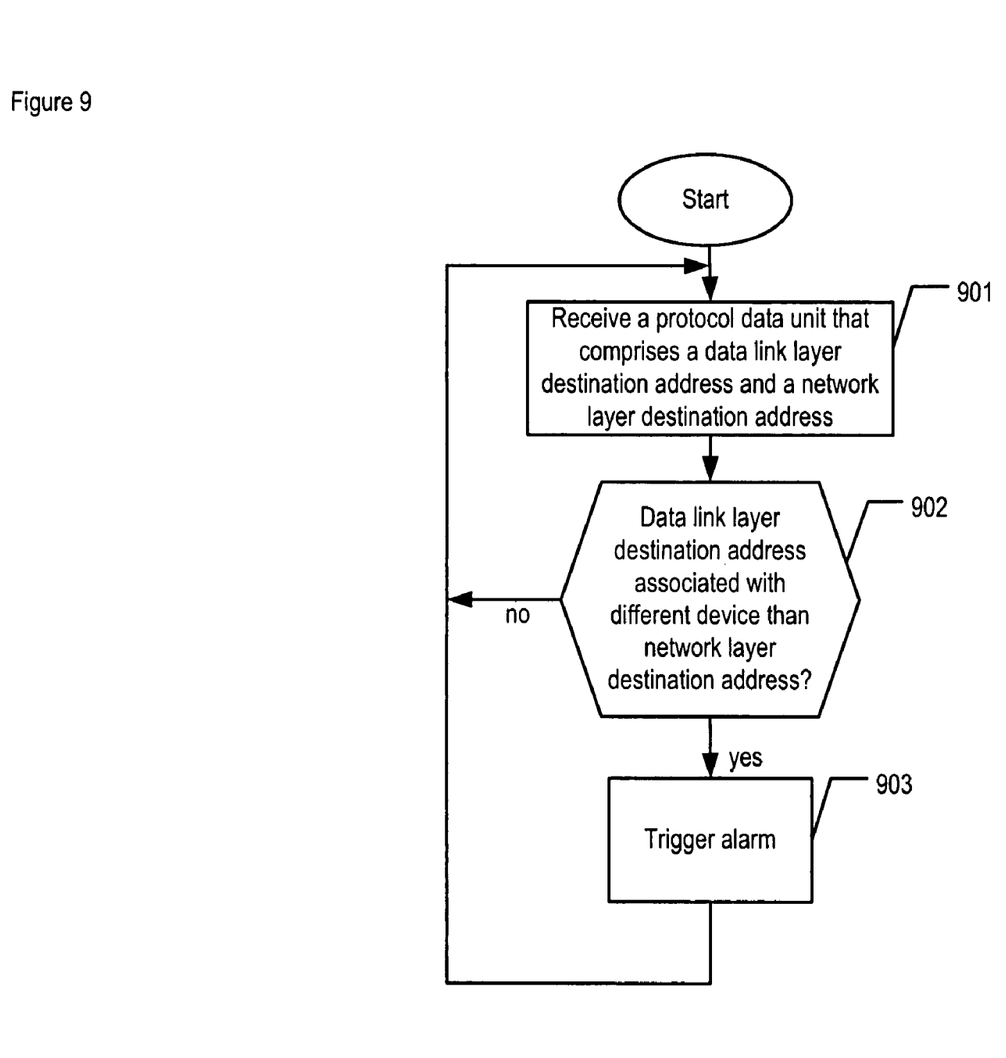
FIG. 9 depicts a flowchart of the salient tasks of a fifth method for detecting the presence of a hidden wireless router, in accordance with the illustrative embodiment of the present invention.

FIG. 9 depicts a flowchart of the salient tasks of a fifth method for detecting the presence of a hidden wireless router, in accordance with the illustrative embodiment of the present invention. It will be clear to those skilled in the art which tasks depicted in FIG. 9 can be performed simultaneously or in a different order than that depicted.

At task 901, test station 208 receives a protocol data unit that comprises a data link layer destination address and a network layer destination address, in accordance with the illustrative embodiment of the present invention. In some embodiments, the data link layer destination address is associated with a device that is, in turn, associated with both (i) a network layer address in a first network (e.g., wireless network portion 210, etc.) and (ii) a network layer address in a second network (e.g., wireline network portion 220, etc.). An example of such a device is a hidden wireless router.

At task 902, a device in network 200 determines whether or not the data link layer destination address of the protocol data unit received at task 901 is associated with the same device as the network layer destination address of the protocol data unit. If the data link layer destination address and the network layer destination address are associated with the same device, then control proceeds to task 901. If the data link layer destination address and the network layer destination address are associated with different devices, then control proceeds to task 903.

At task 903, a device in network 200 triggers an alarm. In some embodiments, the alarm comprises the network layer address in a first network or the network layer address in a second network or both.

Figure 10:
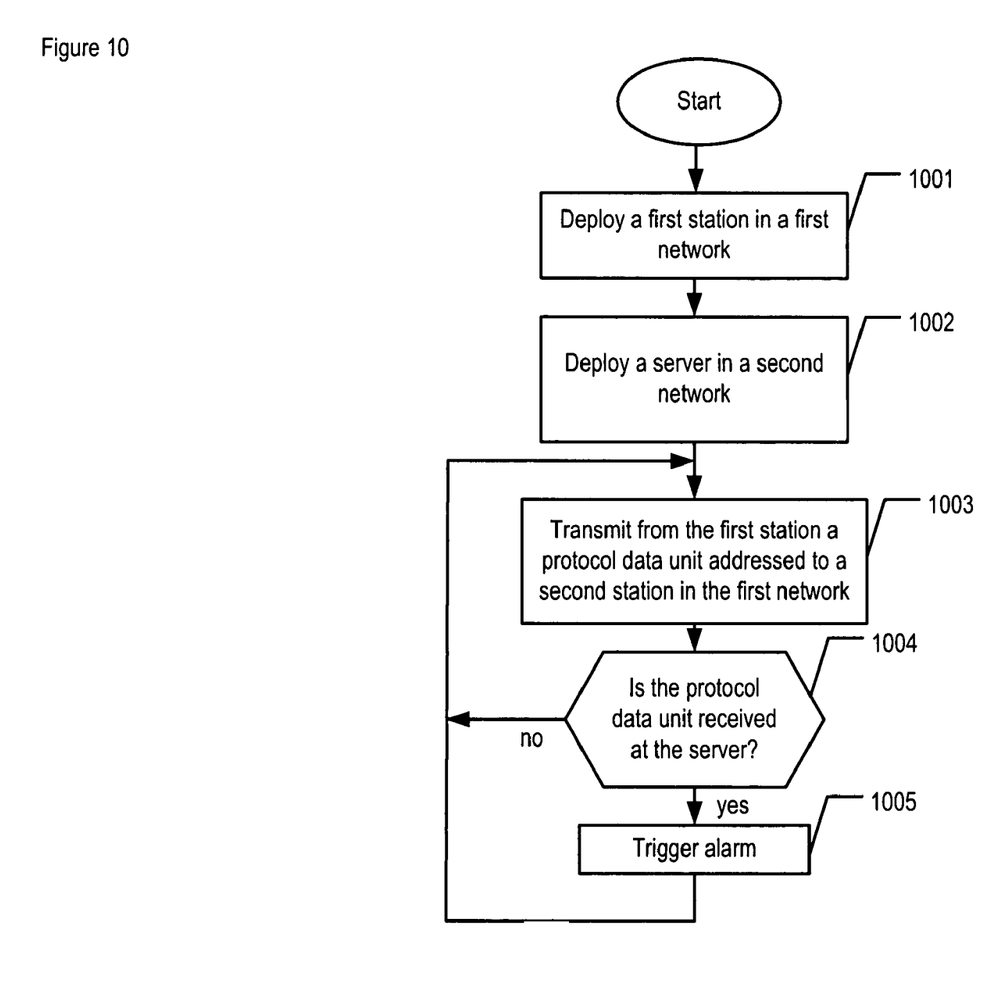
FIG. 10 depicts a flowchart of a method for determining if unauthorized routing between a first network and a second network is occurring, in accordance with the illustrative embodiment of the present invention.

FIG. 10 depicts a flowchart of a method for determining if unauthorized routing between a first network (e.g., wireless network portion 210, etc.) and a second network (e.g., wireline network portion 220, etc.) is occurring, in accordance with the illustrative embodiment of the present invention. It will be clear to those skilled in the art which tasks depicted in FIG. 10 can be performed simultaneously or in a different order than that depicted.

At task 1001, a first station, test station 208, is deployed in a first network, an example being wireless network portion 210.

At task 1002, a server, test server 209, is deployed in a second network, an example being wireline network portion 220. The first network is connected to the second network through a secure access server, such as secure access server 203.

At task 1003, test station 208 attempts to send a protocol data unit to test server 209 in the second network via a second station, wireless client 201-3, in the first network. In the illustrative embodiment of the present invention, test station 208 sends the protocol data unit to test server 209 by transmitting to wireless client 201-3 a protocol data unit having a destination address equal to an address of test server 209. In some embodiments, the protocol data unit comprises a network layer address source address of the second station.

At task 1004, if the protocol data unit was received at test server 209, control proceeds to task 1005. If the protocol data unit was not received at test server 209, control proceeds to task 1003.

At task 1005, test server 209 (or some other device in network 200) triggers an alarm. In some embodiments, the alarm comprises a network layer address in the first network (e.g., the source address of the second station, etc.) or a network layer address in the second network or both.

In the event that test server 209 detects an illegitimately routed protocol data unit, in some embodiments test server 209 can be arranged to record the network layer source address of the protocol data unit, and then use that network layer source address as a means of identifying the logical network location and physical location of the hidden wireless router so that it can be disabled. For example, in some embodiments of the present invention, the network layer source address as recorded at test server 209 can be used as an index into a database relating network layer addresses of wireline network stations to corresponding wireline network port numbers, thereby obtaining the wireline network port number of the hidden wireless router. Steps can then be taken to disable the network jack associated with that port number, or, alternatively, administrative personnel can physically unplug or otherwise disable the hidden wireless router.

It is to be understood that the above-described embodiments are merely illustrative of the present invention and that many variations of the above-described embodiments can be devised by those skilled in the art without departing from the scope of the invention. For example, in this Specification, numerous specific details are provided in order provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method for determining if unauthorized routing between a first network and a second network is occurring, comprising:
    deploying a first station in said first network;
    deploying a test server in said second network connected to said first network through a secure access server;
    transmitting from said first station a protocol data unit addressed to a second station in said first network, wherein said protocol data unit comprises a network layer source address of said second station, and an address of said test server;
    triggering an alarm if said protocol data unit is received at said test server, wherein said alarm comprises said network layer source address of said second station; and
    detecting at said test server that said network layer source address of said second station is identified as an unauthorized router.

2. The method of claim 1 further comprising obtaining a wireline network port number corresponding to said network layer source address of said second station.

3. The method of claim 2 further comprising disabling a network jack associated with said wireline network port number.

* * * * *